United States Patent [19]

Bansal et al.

[11] Patent Number: 4,892,566

[45] Date of Patent: Jan. 9, 1990

[54] PRESSURE SWING ADSORPTION PROCESS AND SYSTEM

[75] Inventors: Ravinder K. Bansal, East Amherst; Edward E. Vrana, West Seneca, both of N.Y.

[73] Assignee: AirSep Corporation, Buffalo, N.Y.

[21] Appl. No.: 326,905

[22] Filed: Mar. 22, 1989

[51] Int. Cl.$^4$ .............................................. B01D 53/04
[52] U.S. Cl. ......................................... 55/26; 55/58; 55/62; 55/68; 55/74; 55/75; 55/162; 55/163; 55/387; 55/389
[58] Field of Search ................... 55/25, 26, 31, 33, 58, 55/62, 68, 74, 75, 161–163, 179, 180, 387, 389

[56] References Cited

U.S. PATENT DOCUMENTS

| 3,104,162 | 9/1963 | Skarstrom | 55/58 |
|---|---|---|---|
| 3,182,485 | 5/1965 | Axt | 55/162 |
| 3,636,679 | 1/1972 | Batta | 55/62 X |
| 3,738,087 | 6/1973 | McCombs | 55/62 X |
| 3,788,036 | 1/1974 | Lee et al. | 55/25 |
| 3,977,845 | 8/1976 | Walter | 55/25 |
| 4,194,890 | 3/1980 | McCombs et al. | 55/18 |
| 4,263,018 | 4/1981 | McCombs et al. | 55/18 |
| 4,373,938 | 2/1983 | McCombs | 55/160 |
| 4,440,548 | 4/1984 | Hill | 55/26 |
| 4,461,630 | 7/1984 | Cassidy et al. | 55/25 |
| 4,477,264 | 10/1984 | Kratz et al. | 55/25 |
| 4,494,966 | 1/1985 | Umeki | 55/26 |
| 4,509,959 | 4/1985 | McCombs | 55/161 |
| 4,534,346 | 8/1985 | Schlaechter | 55/25 X |
| 4,561,865 | 12/1985 | McCombs et al. | 55/25 |
| 4,572,723 | 2/1986 | Ward | 55/25 |
| 4,684,377 | 8/1987 | Haruna et al. | 55/62 X |
| 4,816,039 | 3/1989 | Krishnamurthy et al. | 55/26 |

Primary Examiner—Robert Spitzer
Attorney, Agent, or Firm—Luedeka, Hodges & Neely

[57] ABSTRACT

A pressure swing adsorption process and system utilize a single adsorber for fractionating at least one constituent from a stream of a gaseous mixture fed into the adsorber and a reservoir for receiving product gas exiting the adsorber. Following a step in the process operation involving a venting of the adsorber inlet during which no product gas is withdrawn, the feed stream is shut off and remains shut off while product gas collected in the reservoir is conducted to the adsorber outlet for the purpose of equalizing the internal pressures of the adsorber and reservoir. Once the pressures are equalized, the flow of the feed stream into the adsorber is resumed and any flow of product gas between the adsorber outlet and the reservoir is shut off so that the continued feed stream flow into the adsorber raises the adsorber pressure to an elevated level. When the flow of product gas from the adsorber is subsequently permitted, the product gas exits the adsorber rapidly and the pressure levels of the adsorber and reservoir move toward equalization.

20 Claims, 6 Drawing Sheets

PRESSURE SWING ADSORPTION PROCESS AND SYSTEM

BACKGROUND OF THE INVENTION

The invention relates generally to the separation of gas mixtures by pressure swing adsorption and relates more particularly to the process steps involved in pressure swing adsorption and systems utilized for carrying out such steps.

The type of pressure swing adsorption system with which this invention is concerned includes one adsorber having a fixed bed of adsorbent material and a reservoir. The adsorber includes an inlet and an outlet accommodating a flow of gas through the adsorbent material, and the adsorbent material is adapted to fractionate at least one constituent from a gaseous mixture, or feed stream, fed into the adsorber inlet so that product gas exits the adsorber outlet. The reservoir is connected in flow communication with the adsorber outlet for receiving the product gas exiting the adsorber.

It is known that operation of the afore described system can be carried out in cycles wherein each cycle includes a series of process steps. For example, the first of such steps may involve a production stage wherein a gaseous feed stream is directed into the adsorber inlet and product gas produced by the adsorber is collected in the reservoir. The feed stream flow and the flow of product gas between the adsorber and the reservoir are subsequently shut off, and the adsorber inlet is vented to the atmosphere in a desorption stage. The feed stream flow into the adsorber and the product gas flow between the adsorber and the reservoir are thereafter resumed. During the initial moments of feed stream resumption, product gas flows from the reservoir to the adsorber as the internal pressure levels of the adsorber and reservoir move toward equalization. The feed stream continues to be delivered into the adsorber inlet so that upon equalization of the adsorber and reservoir pressures, the process cycle begins again with a production stage. The aforedescribed process steps of the operation may be controlled with valves connected upstream and downstream of the adsorber and suitable timing mechanisms and control switches associated with the valves. An example of a prior art system of the aforedescribed type is shown and described in U.S. Pat. No. 4,561,865.

It is an object of the present invention to provide a new and improved pressure swing adsorption process utilizing a single adsorber and a system for performing such a process.

Another object of the present invention is to provide such a process and system wherein the production of product gas by the process and system is enhanced.

Yet another object of the present invention is to provide such a process and system which is particularly well-suited for providing a product stream of relatively high purity oxygen from air.

A further object of the present invention is to provide such a system which is uncomplicated in construction and effective in operation.

SUMMARY OF THE INVENTION

This invention resides in a pressure swing adsorption process and system utilizing an adsorber having an inlet and an outlet and a bed of adsorbent material adapted to fractionate at least one constituent from a feed stream of a gaseous mixture routed through the adsorber between the adsorber inlet and adsorber outlet and reservoir means for receiving product gas exiting the adsorber outlet.

In one embodiment of the process, the system undergoes operation cycles including, in sequence, a production stage, a desorption stage, a feed delay stage, and an equalization stage. During the production stage, the feed stream of the gaseous mixture is fed into the adsorber inlet so that product gas exits the adsorber outlet and accumulates within the reservoir means and so that the internal pressures of the adsorber and reservoir means are raised to elevated levels. During the desorption stage which follows, the feed stream flow to the adsorber inlet and the flow of product gas between the adsorber outlet and reservoir means are shut off, and the adsorber inlet is vented so that the adsorber pressure falls below that of the reservoir means. A flow of product gas is subsequently conducted from the reservoir means into the adsorber outlet while the feed stream flow to the adsorber inlet remains shut off so that the adsorber outlet receives an initial flow of product gas from the reservoir means before any counterflow of feed stream air is introduced into the adsorber inlet. This initial flow of product gas helps to sharpen the mass transfer zone in the adsorber and is advantageous in this respect. Following a delay, the feed stream flow to the adsorber inlet is resumed so that the internal pressure of the adsorber equalizes with that of the reservoir means in an equalization stage. The production step is thereafter repeated to re-begin a cycle of the one process embodiment.

In another embodiment of the process, production and desorption stages are carried out like that of the aforedescribed one process embodiment and are followed by an equalization stage wherein the feed stream flow into the adsorber inlet is resumed and a flow of product gas from the reservoir means is conducted into the adsorber outlet so that the internal pressure levels of the adsorber and the reservoir means move toward equalization. The flow of product gas between the reservoir and the adsorber is subsequently shut off so that the continued delivery of the feed stream into the adsorber inlet raises the internal pressure level of the adsorber to a high level. Product gas is then routed from the adsorber outlet into the reservoir means so that the internal pressure levels of the adsorber and reservoir means move toward equalization. The adsorption which takes place at the high pressure level prior to delivery into the reservoir means substantially enhances the product gas production during the subsequent step of routing the product gas into the reservoir, and the raising of the adsorber pressure level is advantageous in this respect. The production stage is subsequently repeated to begin a cycle of the another process embodiment again.

DETAILED DESCRIPTION OF THE ILLUSTRATED EMBODIMENTS

Figure 1:
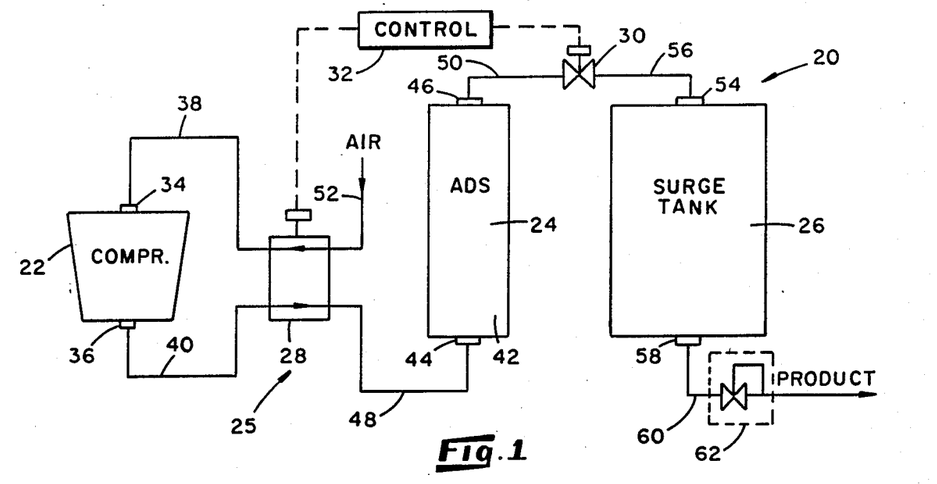
FIG. 1 is a view illustrating in diagrammatic form a system embodiment with which a pressure swing adsorption process can be carried out and illustrating one condition of a four-way valve of the system.

Turning now to the drawings in greater detail, there is represented in FIG. 1, an embodiment, generally indicated 20, of a system for fractionating at least one component or constituent from a gaseous mixture by pressure swing adsorption. In the depicted system 20, the gaseous mixture is drawn into the system 20 in the form of a feed stream and exits the system 20 as a gaseous product which is substantially free of the fractionated component. As will be apparent herein, the system 20 is specifically described and illustrated in relation to the application of pressure swing adsorption to the fractionation of air to produce an oxygen-rich stream, but it will be understood that the principles of the present invention can be variously applied.

The system 20 includes a compressor 22, an adsorber 24 having a single bed of adsorbent material, a reservoir in the form of a surge tank 26 for collecting product gas exiting the adsorber 24, and a network of conduits described herein which permit operative flow communication between the compressor 22 and adsorber 24 and between the adsorber 24 and the surge tank 26. In addition, valving means 25 including a first valve 28 and a second valve 30 enable the flow of gas through the apparatus conduits to be controlled, and control means 32 control the actuation of the valves 28 and 30 to sequence the system 20 through its stages of operation.

The compressor 22 is dedicated to the system 20 of FIG. 1 in that it has no function other than to feed air, under pressure, to the adsorber 24. In the interests of this invention, however, it will be understood that an alternative system may receive air from some other, or undedicated, air source having its purpose to feed air, under pressure, to a plurality of facilities. In the depicted FIG. 1 system, the air compressor 22 has an inlet 34 and an outlet 36, and flow conduits 38, 40 are operatively connected to the compressor inlet 34 and outlet 36, respectively.

The adsorber 24 of the system 20 includes a single vessel 42 having an inlet 44 and an outlet 46 and having an interior cavity disposed between the inlet 44 and the outlet 46. The vessel cavity is substantially filled with a bed of adsorbent material adapted to adsorb nitrogen from air routed therethrough. In this connection, the adsorption bed of the adsorber 24 may be comprised of any of a number of adsorbent materials such as activated carbon, silica gel or a molecular sieve material known as sodium alumina silicate. When the system 20 is in use, the adsorbent material adsorbs nitrogen from air routed from the adsorber inlet 44 to the adsorber outlet 46 so that the gaseous product exiting the adsorber outlet 46 is a high-purity oxygen gas. Furthermore, the adsorbent material is adapted to release its adsorbed nitrogen when depressurized and/or purged by a purge gas for purposes of regenerating the adsorbent material. In the depicted system 20, a portion of the oxygen-rich product gas collected within the surge tank 26 is used to purge the adsorber 24. For purposes of conducting gas into or out of the adsorber vessel 42, flow conduits 48 and 50 are operatively connected to the adsorber inlet 44 and outlet 46, respectively.

With reference still to FIG. 1, the first valve 28 is in the form of a four-way valve operatively connected between the compressor conduits 38 and 40 and the adsorber inlet conduit 48 for selectively permitting flow communication between the adsorber inlet 44 and the compressor outlet 36 or between the adsorber inlet 44 and the compressor inlet 34. A fourth conduit 52 is operatively connected to the four-way valve 28 for directing gas into or out of the valve 28. The four-way valve 28 permits the compressor 22 to be operated continuously during operation of the system 20 so that by selectively switching the four-way valve 28 between two switch modes, the compressor 22 either directs atmospheric air through the compressor 22 and into the adsorber inlet 44 or directs waste gas pulled from the adsorber inlet 44 by the compressor 22 through conduit 52 for venting to the atmosphere. In this connection, the four-way valve 28 is positionable in an open condition, as shown in FIG. 1, so that atmospheric air is drawn into the compressor inlet 34 by way of conduits 52 and 38 and so that the air is delivered from the compressor outlet 36 to the adsorber inlet 44 by way of conduits 40 and 48. The four-way valve 28 is also positionable in a closed condition, as shown in FIG. 2, so that waste gas is withdrawn from the adsorber inlet 44 and through the conduits 48 and 38 by the compressor 22 and pumped into the atmosphere by way of conduits 40 and 52.

Figure 2:
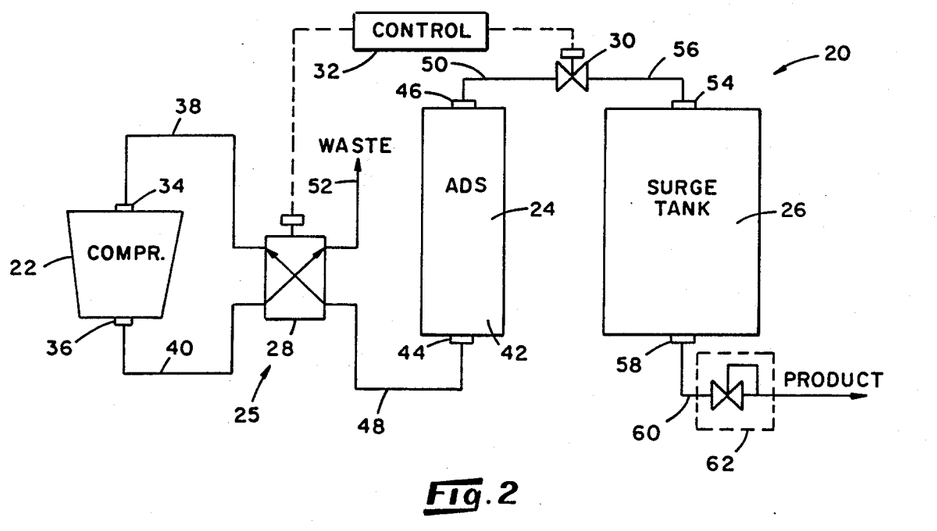
FIG. 2 is a view similar to that of FIG. 1 illustrating another condition of the four-way valve of the FIG. 1 system.

With reference still to FIGS. 1 and 2, the surge tank 26 includes an inlet 54 and an outlet 58 and, as mentioned earlier, collects product gas exiting the adsorber outlet 46 as an oxygen-rich gas. For purposes of conducting product gas into and out of the surge tank 26, conduits 56, 60 are operatively connected to the tank inlet 54 and outlet 58, respectively. Furthermore, an oxygen regulator 62 is connected downstream of the surge tank outlet 58 to facilitate the withdrawal of product gas from the surge tank 26 at a regulated pressure.

The second valve 30 is connected between the adsorber 24 and the surge tank 26 and is in the form of a two-way valve operatively joined between the adsorber outlet conduit 50 and tank inlet conduit 56 for controlling the flow of gas therethrough. The valve 30 can be switched between an open position at which gas flow between the adsorber outlet 46 and the surge tank inlet 54 is permitted and a closed condition at which no flow is permitted between the adsorber outlet 46 and the surge tank inlet 54.

Each of the aforedescribed four-way valve 28 and two-way valve 30 in the system 20 is a solenoid-type valve responsive to a turning on or shutting off of power to the valve. In addition, the control means 32 of the system 20 includes timing mechanisms operatively wired to the valves 28 and 30 for selectively opening or closing the valves 28 and 30 at the end of a predetermined period of time. Hence, product production and regeneration operations, described herein, are automatically controlled in the system 20 by automatically controlling the amount of time that each of the valves 28 and 30 is opened and closed.

Figure 3:
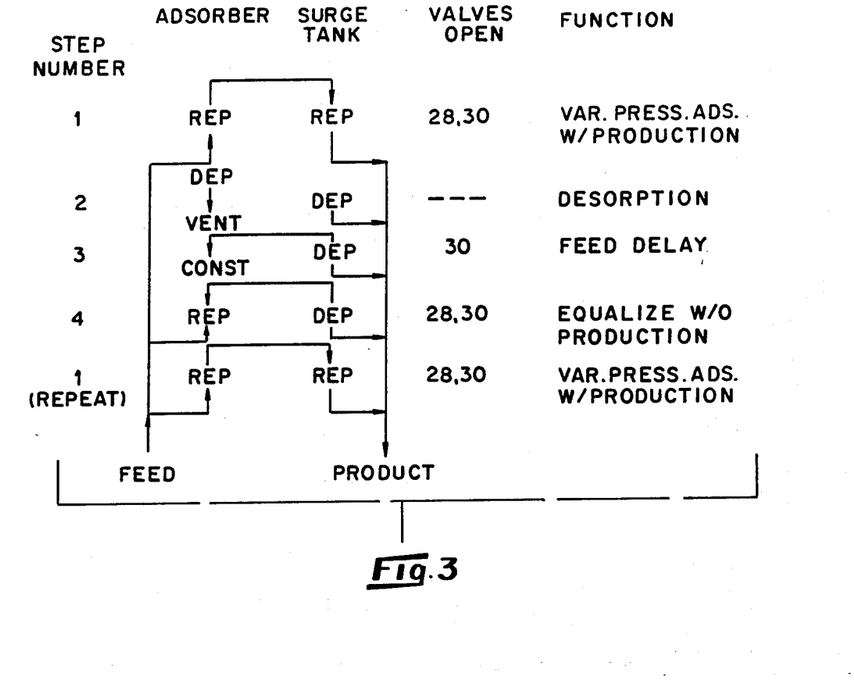
FIG. 3 is a chart depicting the various stages of operation of one embodiment of a pressure swing adsorption cycle.
Figure 4:
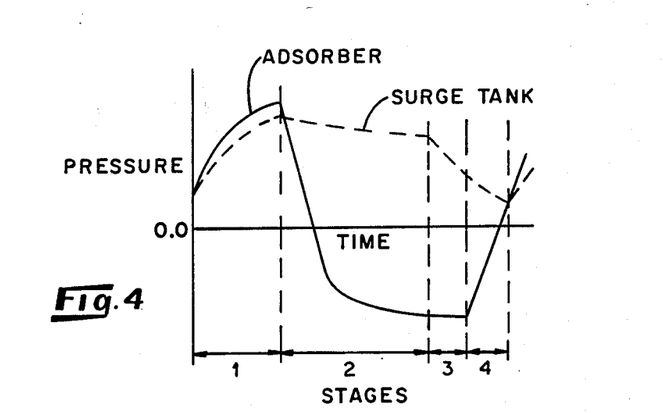
FIG. 4 is a graph illustrating the pressure levels of the system adsorber and surge tank during the stages of the cycle depicted in FIG. 3.

With reference to FIGS. 3 and 4, one embodiment of a pressure swing adsorption process performed by the system 20 includes operating cycles wherein each cycle is comprised of four stages. Briefly, the first stage can be described as a production stage during which a feed stream of air is directed into the adsorber inlet 44 so that product gas exits the adsorber outlet 46 and flows into the surge tank 26. The second stage can be described as a desorption stage during which the flow of product gas between the adsorber 24 and surge tank 26 is shut off and the adsorber inlet 44 is vented to the atmosphere. The third stage can be described as a feed delay stage during which product gas is conducted from the surge tank 26 to the adsorber outlet 46 while the adsorber inlet 44 continues to be vented. The fourth stag can be described as an equalization step during which the feed stream flow into the adsorber inlet 44 is resumed so that the internal pressures levels of the adsorber 24 and surge tank 26 move toward equalization.

Operation of the aforedescribed one process embodiment can be best understood through a description of the sequencing of the four-way and two-way valves 28 and 30 of the system 20. At the outset of the first, or production, stage and with reference still to FIGS. 3 and 4, the internal pressures of the adsorber 24 and the surge tank 26 are equal and the four-way and the two-way valves 28 and 30 are in an opened condition. With the valves 28 and 30 opened, air is pumped by the compressor 22 into the adsorber inlet 44 so that the adsorber 24 produces oxygen-rich product gas which exits the adsorber outlet 46 and is collected by the surge tank 26. During this production step and as shown in FIG. 4, the internal pressures in both the adsorber 24 and surge tank 26 are raised to an elevated level.

The second, or desorption, stage is initiated when the adsorber 24 becomes about saturated, and, accordingly, the timing controls of the system control means 32 are preset to simultaneously close the four-way and the two-way valves 28, 30 following a period of time normally required to saturate the adsorber 24 during the first, or production, stage. With the valves 28, 30 closed, the adsorber inlet 44 is vented to the atmosphere and no flow of gas is permitted to flow between the adsorber 24 and the surge tank 26. As the adsorber inlet 44 is vented to the atmosphere, the gas constituent adsorbed by the bed of adsorbent material flows out of the adsorber inlet 44 and the internal pressure of adsorber 24 is permitted to fall below the level of atmospheric pressure.

As shown in FIG. 4, the pressure of the adsorber 24 falls significantly below that of the surge tank 26 during the second, or desorption, stage. With regard to the decrease of surge tank pressure during this second stage, as reflected in FIG. 4, it will be understood that product gas may be continually withdrawn from the surge tank 26 through conduit 60 (FIG. 1) for use during any or all stages of system operation. Accordingly, the surge tank pressures plotted in the graphs of FIG. 4 (and the graphs of FIGS. 6 and 8, discussed herein) reflect a continued withdrawal of product gas from the surge tank outlet 58.

The two-way valve 30 is opened following the desorption stage to initiate the third, or feed delay, stage so that product gas contained within the surge tank 26 is permitted to flow back into the adsorber outlet 46 while the four-way valve 28 remains closed. As shown in FIG. 4, the pressure of the surge tank 26 falls during this feed delay stage while the adsorber pressure level remains constant at a level below the level of atmospheric pressure.

Following a predetermined period of time such as, for example, a few seconds, the four-way valve 28 is opened to begin the fourth, or equalization stage, and so that a feed stream flow of air is again delivered by the compressor 22 to the adsorber inlet 44. The two-way valve 30 remains open during this fourth stage so that the pressure levels of the adsorber 24 and surge tank 26 move toward equalization, as reflected in FIG. 4. Following equalization of the adsorber and surge tank pressures, the air feed stream continues to be delivered into the adsorber inlet 44 to rebegin the production stage and thus another operation cycle.

An advantage provided by the aforedescribed one process embodiment relates to the delay in the reintroduction of the air feed stream into the adsorber 24 until a portion of the collected product gas has been conducted back into the adsorber outlet 26. It has been found that by delaying the flow of the air feed stream as afóredescribed, the adsorber bed of adsorbent material is exposed, for a prescribed period of time, to an initial flow of product gas from the surge tank 26 before a flow of feed stream air is routed through the adsorber bed in a direction counter to the direction in which the initial flow of product gas from the surge tank 26 flows through the adsorber 24. Such an initial flow, or pulse, of product gas into the adsorber outlet 46 and through the adsorber bed substantially helps to sharpen the mass transfer zone in the adsorber 24. Consequently, oxygen recovery for the system 20 is improved, and the feed delay step is advantageous in this respect.

Figure 5:
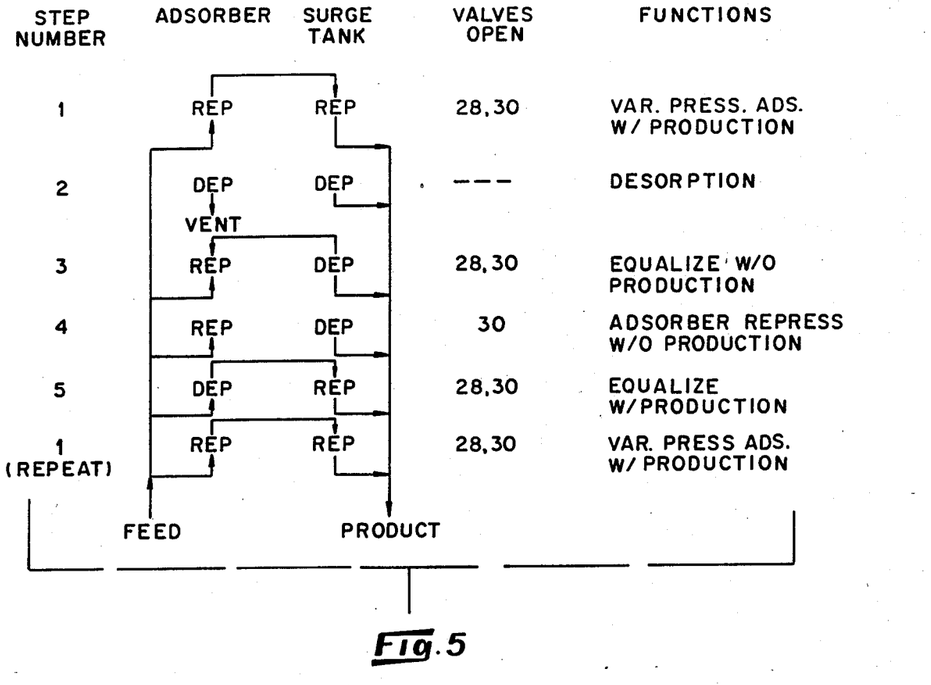
FIG. 5 is a chart depicting the various stages of operation of another embodiment of a pressure swing adsorption cycle.
Figure 6:
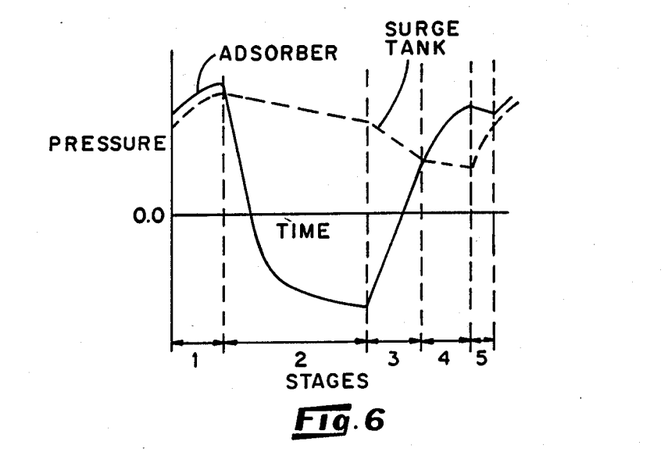
FIG. 6 is a graph illustrating the pressure levels of the system adsorber and surge tank during the stages of the cycle depicted in FIG. 5.

With reference to FIGS. 5 and 6, another embodiment of the adsorption process includes operating cycles wherein each cycle is comprised of five stages. The first two stages of this another embodiment correspond to the production and desorption stages described above in connection with the one process embodiment. In other words, the cycle begins when air under pressure is fed by the compressor 22 into the adsorber inlet 44 so that product gas is collected by the surge tank 26. To begin the second, or desorption, stage, the flow of product gas between the adsorber 24 and the surge tank 26 is shut off and the adsorber inlet 44 is vented to the atmosphere. The third stage can be described as an equalization-without-production stage during which pressures in the adsorber 24 and surge tank 26 are equalized but no product gas is produced by the adsorber 24. To initiate the third stage, air under pressure is re-introduced by the compressor 22 into the adsorber inlet 44 and product gas is permitted to flow between the adsorber 24 and the surge tank 26.

The fourth stage can be described as an adsorber re-pressurization stage during which the adsorber pressure is raised to an elevated level but no product gas is permitted to flow from the adsorber outlet 46. To initiate this fourth stage, the flow of product gas between the adsorber 24 and the surge tank 26 is shut off so that the continued delivery of feed stream air into the adsorber inlet raises the adsorber pressure to a level substantially above that of the surge tank pressure. The fifth stage can be described as an equalization-with-production stage during which the adsorber and surge tank pressures move toward equalization and product gas flows from the adsorber outlet 46. To initiate this fifth stage, the flow of product gas is again permitted between the adsorber 24 and surge tank 26. An air feed stream continues to be introduced into the adsorber inlet 44 following equalization of the adsorber and the surge tank pressures so that the operation cycle begins again with the first, or production, stage.

Operation of the aforedescribed another process embodiment can best be understood through a description of the sequencing of the four-way and two-way valves 28 and 30 of the system 20 and with reference to FIGS. 5 and 6. At the onset of the first, or production, stage, the internal pressures of the adsorber 24 and surge tank 26 are equal and the four-way and two-way valves 28 and 30 are in an opened condition. During this first production step, the internal pressures of both of the adsorber 24 and surge tank 26 are raised to an elevated level. At the outset of the second, or desorption, stage, the valves 28, 30 are simultaneously closed so that no gas is permitted to flow between the adsorber 24 and the surge tank 26 and the adsorber inlet 44 is vented to the atmosphere. As indicated in FIG. 6, the adsorber pressure falls substantially below that of the surge tank 26 during this desorption stage (e.g., to a level below the level of atmospheric pressure). Both of the valves 28, 30 are simultaneously opened to initiate the third, or equalization-without-production, stage so that the air feed stream is again introduced by the compressor 22 into the adsorber inlet 44 and the flow of product gas between the adsorber 24 and surge tank 26 is permitted. Because the adsorber pressure is below that of the surge tank 26 during this third stage, product gas flows from the surge tank 26 into the adsorber outlet 46.

Upon equalization of the adsorber and surge tank pressures, the two-way valve 30 is closed to shut off any flow of product gas between the adsorber 24 and surge tank 26 and initiate the fourth, or adsorber re-pressurization, stage. With the continued delivery of the air feed stream into the adsorber inlet 44 and as indicated in FIG. 6, the internal pressure level of the adsorber 24 elevates to a level appreciably above that of the surge tank 26. Once the elevated adsorber pressure level is reached, the two-way valve 30 is re-opened to initiate the aforedescribed equalization-with-production stage of the further embodiment. By re-opening the two-way valve 30, product gas rapidly exits the adsorber outlet 46 due to the pressure differential between the adsorber 24 and surge tank 26. Hence, product gas is rapidly produced during this fifth stage while the adsorber and surge tank pressures move toward equalization. When the adsorber and surge tank pressures are about equal, the internal pressure levels of both the adsorber 24 and surge tank 26 begin to rise, due to the continued delivery of feed stream air into the adsorber inlet 44, to re-begin the operation cycle.

An advantage provided by the aforedescribed another process embodiment relates to the fourth, or adsorber repressurization, stage wherein the adsorber pressure is raised to an elevated level while no product gas is permitted to flow from the adsorber 24. By raising the adsorber pressure to an elevated level before initiating product withdrawal, the adsorption takes place at a high pressure as shown in FIG. 6. Compared to the variable pressure adsorption stages in state-of-the-art systems, the adsorption which takes place during the aforedescribed adsorber re-pressurization stage has been found to substantially enhance the oxygen production by the adsorber 24 during the subsequent fifth, or equalization-with-production stage.

Figure 7:
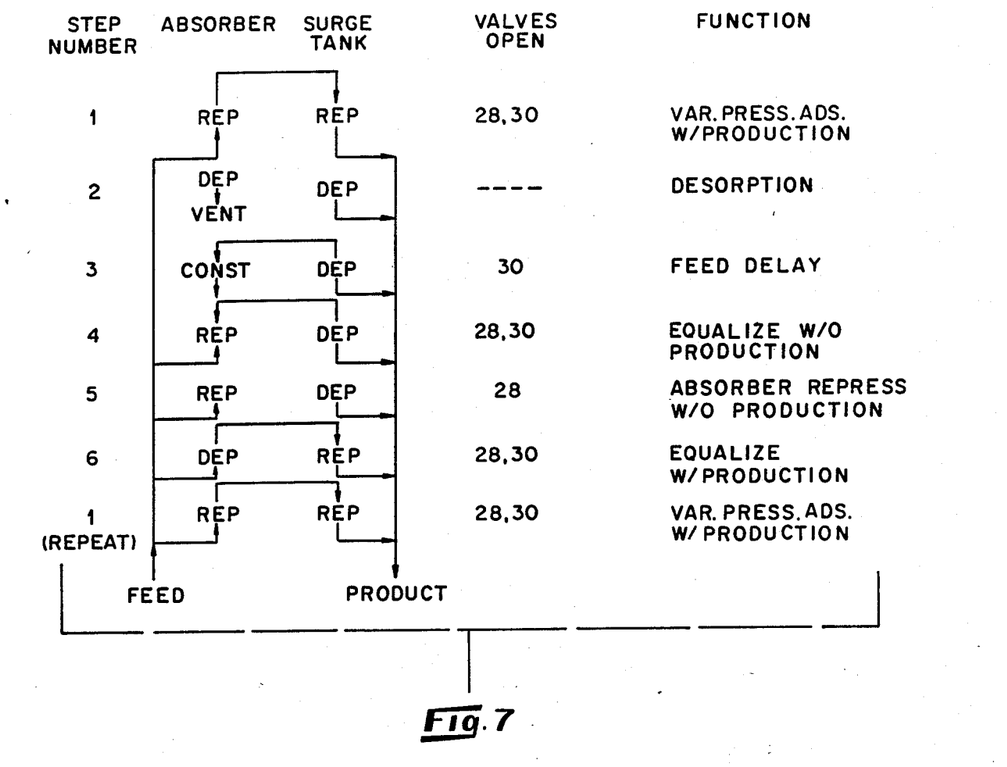
FIG. 7 is a chart depicting the various stages of operation of a further embodiment of a pressure swing adsorption cycle.
Figure 8:
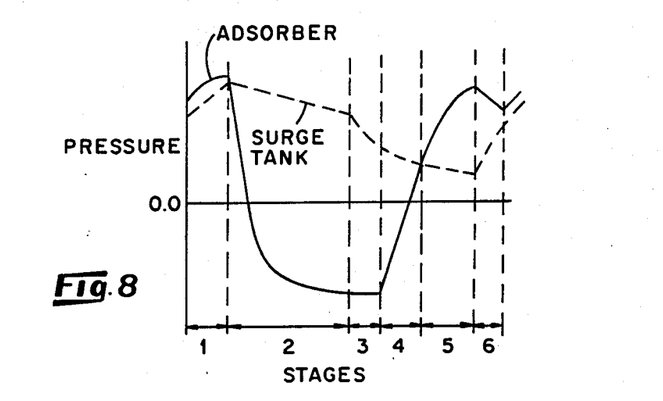
FIG. 8 is a graph illustrating the pressure levels of the system adsorber and surge tank during the stages of the cycle depicted in FIG. 7.

With reference to FIGS. 7 and 8, a further embodiment of a pressure swing adsorption process includes operating cycles wherein each cycle is comprised of six steps. As will be apparent herein, the advantageous steps included in the aforedescribed one and another process embodiments are incorporated into this further embodiment. Briefly, the first and second stages can be described, respectively, as production and desorption stages which correspond in operation to the first and second stages of the aforedescribed one and another process embodiments. The third and fourth stages can be described, respectively, as feed delay and equalization-without-production stages corresponding to the third and fourth stages of the aforedescribed one process embodiment. Finally, the fifth and sixth stages can be described, respectively, as an adsorber re-pressurization stage and an equalization-with-production stage, corresponding to the aforedescribed fourth and fifth stages of the aforedescribed another process embodiment. Upon completion of the sixth stage at which the adsorber and surge tank pressures are about equal, the continued introduction of the air feed stream into the adsorber inlet re-begins the operation cycle with the first, or production, stage.

The switching of the four-way and two-way valves 28, 30 of the system 20 during an operational cycle of this further process embodiment is depicted in FIG. 7 while the internal pressure levels of the adsorber 24 and surge tank 26 during the cycle stages of this embodiment are shown in FIG. 8. As in the aforedescribed one and another process embodiments, the adsorber and surge tank pressures are about equal at the beginning of the first stage, and the four-way and two-way valves 28 and 30 remain open so that a feed stream of air is delivered into the adsorber inlet 44 and product gas exits the adsorber outlet 26 for collection within the surge tank 26. The internal pressures of both adsorber 24 and surge tank 26 increase during this first stage. When the adsorber 24 becomes about saturated, the valves 28 and 30 are simultaneously closed to begin the second, or desorption, stage so that the adsorber inlet 44 is vented to the atmosphere and so that the internal pressure of the adsorber 24 is permitted to fall substantially below that of the surge tank 26.

The third, or feed delay, stage is initiated by the opening of the two-way valve 30 so that product gas is conducted to the adsorber 24 while the adsorber inlet 44 continues to be vented to the atmosphere. The four-way valve 28 is subsequently opened so that the contributions of feed stream air from the compressor 22 and product gas from the surge tank 26 move the internal pressure levels of the adsorber 24 and surge tank 26 toward equalization. Once equalization is reached, the two-way valve 30 is closed so that the adsorber pressure is raised to an elevated level by the continued introduction of feed stream air. The two-way valve 30 is thereafter opened to effect rapid product withdrawal from the adsorber 24 and move the internal pressure levels of the adsorber 24 and surge tank 26 toward equalization. When the pressure levels are about equal, the continued feed stream of air from the compressor 22 begins to raise the pressures of both the adsorber 24 and surge tank 26 and thus re-start the operation cycle.

The aforedescribed further process embodiment is advantageous for the contributions provided by both the aforedescribed one and another process embodiments depicted in FIGS. 3–6. In particular, by delaying the feed of air under pressure into the adsorber inlet 44 before the subsequent equalization-without-production stage and by repressurizing the adsorber 24 to a high pressure level above that of the surge tank 26 before product gas is withdrawn from the adsorber 24 combines the advantages of both the aforedescribed one process embodiment and another process embodiment into a single, alternative process embodiment. It has been found that combining the advantageous steps of the one and another process embodiments into a single embodiment for producing oxygen-rich gas from a stream of feed air, the efficiency of the system is about fifteen to twenty percent higher than that of conventional pressure swing adsorption processes employing a single adsorber bed.

Figure 9:
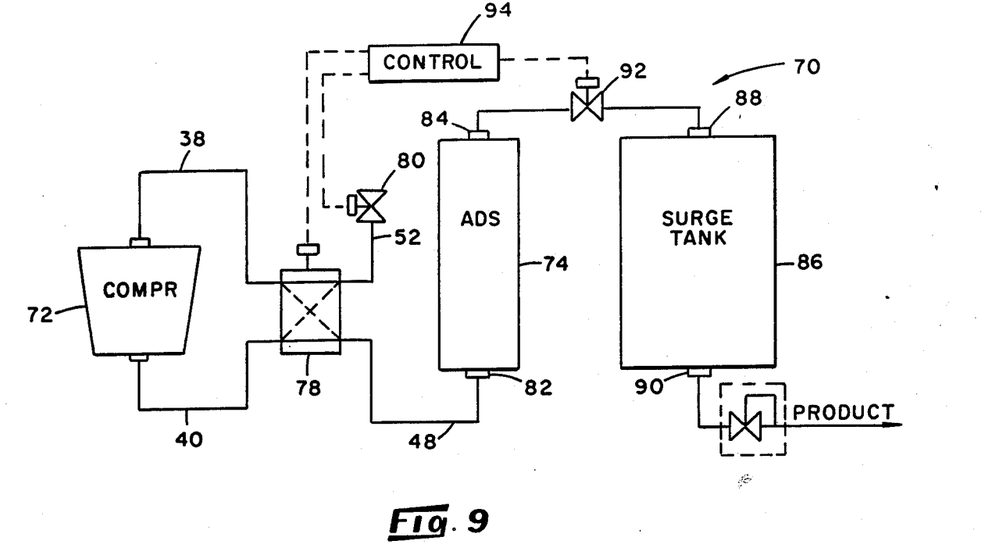
FIG. 9 is a view similar to that of FIG. 1 of another system embodiment with which a pressure swing adsorption process can be carried out.

It will be understood that numerous modifications and substitutions can be had to the aforedescribed embodiments without departing from the spirit of the invention. For example, although the system 20 of FIGS. 1 and 2 has been shown and described as including only a four-way valve 28 in association with the compressor 22, additional valves may be used. For example, there is illustrated in FIG. 9 a system 70 having an air compressor 72, an adsorber 74, and both a four-way valve 78 and a two-way valve 80 associated with the compressor 72. The four-way valve 78 has been operatively connected between the air compressor 72 and adsorber 74 in a manner similar to that of the four-way valve 22 of the system 20 of FIGS. 1 and 2, and accordingly, the associated conduits are given the same reference numerals. The permitted flow paths for air or gas when the four-way valve 78 is opened are indicated in solid lines within the depicted valve 78 of FIG. 9 while the permitted flow paths for air or gas when the four-way valve 78 is closed are indicated in dotted lines within the depicted valve 78. The two-way valve 80 is connected to the vent conduit 52 and operable between opened and closed conditions a which flow through the conduit 52 is selectively permitted or shut off. The adsorber 74 has an inlet 82 and an outlet 84, and the system 70 also includes a surge tank 86 having an inlet 88 and an outlet 90. A two-way valve 92 is disposed between the adsorber outlet 84 and surge tank inlet 88, and control means 94 are operatively connected to the valves 78, 80, 92 for controlling the sequencing of the valves 78, 80, 92 and thus the operating cycles of the system operation.

Figure 10:
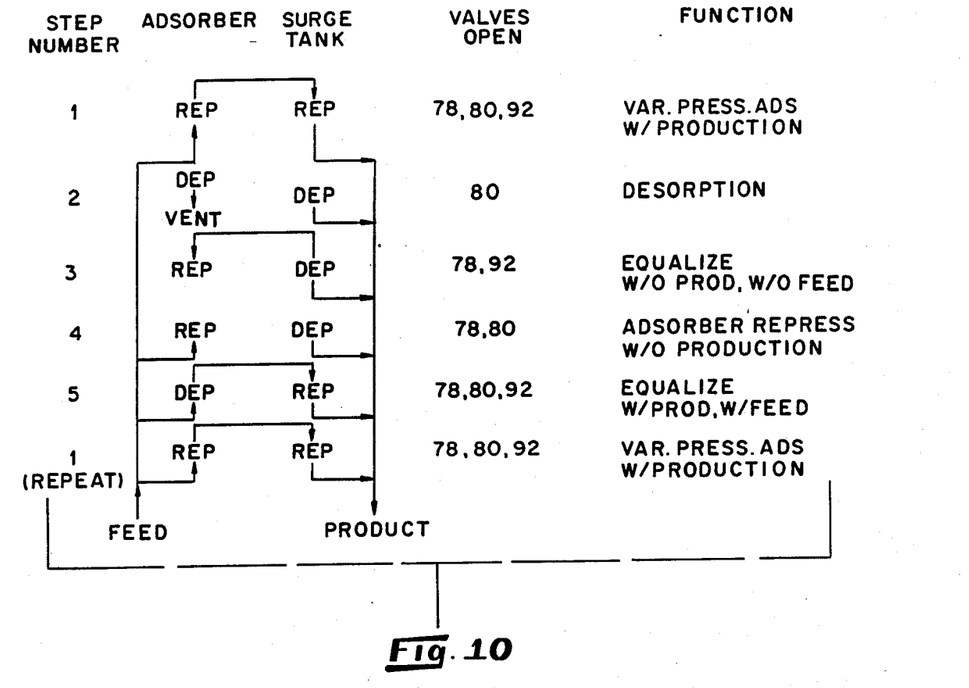
FIG. 10 is a chart depicting the various stages of operation of a still further embodiment of a pressure swing adsorption cycle.
Figure 11:
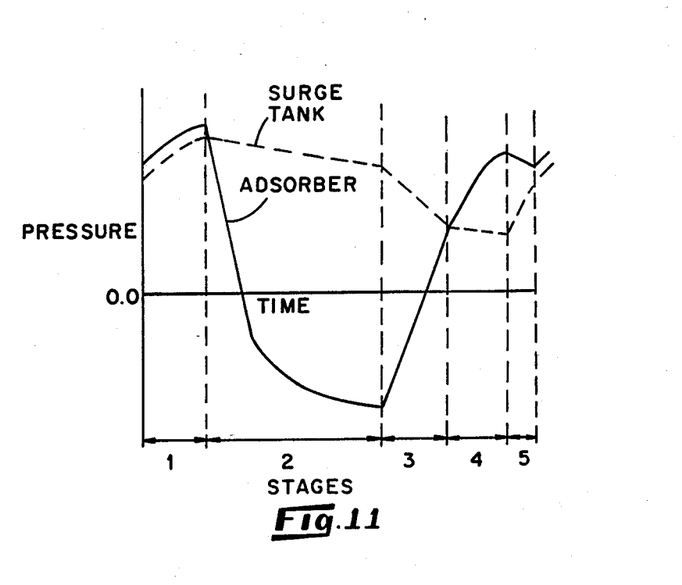
FIG. 11 is a graph illustrating the pressure levels of the system adsorber and surge tank during the stages of the cycle depicted in FIG. 10.

An illustrative process performed by the system 70 is depicted in FIG. 10 while the adsorber and surge tank pressures during the process cycle are shown in FIG. 11. During the first stage of the cycle, every valve 78, 80 and 92 is open so that air is pumped from the atmosphere into the adsorber 74 and so that product gas exits the adsorber outlet 84 and accumulates in the surge tank 86. Pressures in both the adsorber 74 and surge tank 86 rise throughout this first stage. To initiate the second stage, valves 78 and 92 are closed so that the adsorber inlet 82 is vented to the atmosphere through the open two-way valve 80 and so that any flow of product gas between the adsorber 74 and surge tank 86 is shut off. As shown in FIG. 11, the pressure of the adsorber 74 falls significantly below that of the surge tank 86 during this second stage. It follows that the first two stages of this illustrative process correspond in operation to the production and desorption stages of the aforedescribed process embodiment.

To initiate the third stage, the two-way valve 80 is closed and the two-way and four-way valves 78 and 92 are opened. Thus, flow of product gas between the surge tank 86 and adsorber 74 is permitted, and flow communication between the adsorber inlet 82 and the atmosphere is cut off. The compressor 72 continues to run, of course, during this third stage but the closing of the two-way valve 80 and the opening of the four-way valve 78 prevents any flow of air or gas into the compressor 72 so that the adsorber 74 receives nothing from the compressor 72 and so that no gas contained within the adsorber 74 is permitted to escape into the atmosphere through the adsorber inlet 82. Thus, the third stage is essentially an equalization stage during which the pressures of the adsorber 74 and surge tank 86 equalize with no input of feed stream air from the compressor 72.

Upon equalization of the adsorber and surge tank 86, the two-way valve 80 is opened and the two-way valve 92 is closed to initiate the fourth stage so that the flow of feed stream into the adsorber inlet 82 is resumed and the flow of product gas between the adsorber 74 and surge tank 86 is shut off. Consequently, the internal pressure of the adsorber 74 is raised to a level appreciably above that of the surge tank 86. The fifth stage is initiated by reopening the two-way valve 92 so that product gas flows rapidly out of the adsorber 74 and into the surge tank 86 and so that the pressure levels of the adsorber 74 and surge tank 86 move toward equalization. It follows that the fourth and fifth stages of this illustrative process correspond in operation with the fourth and fifth stages of the aforedescribed another process embodiment depicted in FIGS. 5 and 6. When the pressure levels of the adsorber 74 and surge tank 86 are about equal, the continued delivery of feed air into the adsorber inlet 82 raises the internal pressures of both the adsorber 74 and surge tank 86 so that the process cycle begins again.

Still further, the control means of the aforedescribed systems have been described as including timing mechanisms appropriately connected to the system valves for actuating the valves at the end of preselected periods of time so that the cycling stages of the apparatus operation are performed during intervals of predetermined duration, but cycling stages may be controlled by other means. For example, the control means may include means for sensing the internal pressure levels of the adsorber or surge tank or preselected ones of the system conduits and means for switching the appropriate valves when the sensed pressure reaches a predetermined level or when a sensed pressure differential reaches a predetermined value.

Accordingly, the aforedescribed embodiments are intended for the purpose of illustration and not as limitation.

What is claimed is:

1. A pressure swing adsorption process utilizing an adsorber having an inlet and an outlet and a bed of adsorbent material adapted to fractionate at least one constituent from a feed stream of a gaseous mixture routed through the adsorber between the adsorber inlet and the adsorber outlet and reservoir means for receiving product gas exiting the adsorber outlet, said process comprising the steps of;

(a) directing the feed stream into the inlet of the adsorber so that product gas exits the adsorber outlet and accumulates in the reservoir means and so that the internal pressures of the adsorber and the reservoir means are raised to elevated levels;

(b) shutting off the feed stream flow to the adsorber inlet and the product gas flow between the adsorber outlet and reservoir means and venting the adsorber inlet so that the internal pressure of the adsorber falls below that of the reservoir means;

(c) conducting a flow of product gas from the reservoir means into the adsorber outlet while the feed stream flow to the adsorber inlet remains shut off; and (d) directing the feed stream into the adsorber inlet to resume feed stream flow thereto and so that the internal pressure of the adsorber equalizes with that of the reservoir means.

2. The process as defined in claim 1 wherein step (d) is followed by a repeat of steps (a) through (d).

3. The process as defined in claim 1 wherein step (d) is followed by the steps of:

(e) shutting off the flow of product gas between the reservoir means and the adsorber so that the continued flow of the feed stream into the adsorber inlet raises the internal pressure of the adsorber to a high level; and (f) routing product gas from the adsorber outlet into the reservoir means so that the product gas begins to re-accumulate in the reservoir means and so that the internal pressure levels of the adsorber and reservoir means move toward equalization.

4. The process as defined in claim 1 wherein step (b) is followed by a step of discontinuing the of the adsorber inlet so that no gas is permitted to escape the adsorber from the adsorber inlet during the subsequent step of conducting.

5. A pressure swing adsorption process utilizing an adsorber having an inlet and an outlet and a bed of adsorbent material adapted to fractionate at least one constituent from a feed stream of a gaseous mixture routed through the adsorber between the adsorber inlet and the adsorber outlet and reservoir means for receiving product gas exiting the adsorber outlet, said process comprising the steps of:

(a) directing the feed stream into the inlet of the adsorber so that product gas exits the adsorber outlet and accumulates in the reservoir means and so that the internal pressures of the adsorber and the reservoir means are raised to elevated levels;

(b) shutting off the feed stream flow to the adsorber inlet and the product gas flow between the adsorber outlet and the reservoir means and venting the adsorber inlet so that the internal pressure of the adsorber falls below that of the reservoir means;

(c) conducting a flow of product gas from the reservoir means into the adsorber outlet and directing the feed stream flow into the adsorber inlet to resume feed stream flow thereto so that the internal pressure levels of the adsorber and the reservoir means move toward equalization;

(d) shutting off the flow of product gas between the reservoir means and the adsorber so that the continued flow of the feed stream into the adsorber inlet raises the internal pressure of the adsorber to a high level; and (e) routing product gas from the adsorber outlet into the reservoir means so that the product gas begins to re-accumulate in the reservoir means and so that the internal pressure levels of the adsorber and reservoir means move toward equalization.

6. The process as defined in claim 5 wherein the step of routing is carried out while the feed stream continues to be directed into the adsorber inlet.

7. The process as defined in claim 5 wherein step (e) is followed by a repeat of steps (a) through (e).

8. The process as defined in claim 5 wherein step (c) includes the steps of:

conducting a flow of product gas from the reservoir means into the adsorber outlet while the feed stream flow to the adsorber inlet remains shut off; and directing the feed stream into the adsorber inlet to resume feed stream flow thereto following a predetermined period of time during which the feed stream flow to the adsorber inlet remains shut off.

9. A pressure swing adsorption process utilizing one adsorber having an inlet and an outlet and a bed of adsorbent material adapted to fractionate at least one constituent from a feed stream of a gaseous mixture routed through the adsorber between the adsorber inlet and the adsorber outlet and reservoir means for receiving product ga exiting the adsorber outlet, said process comprising the steps of:

(a) directing the feed stream flow into the inlet of the adsorber so that product gas exits the adsorber outlet and accumulates in the reservoir means and so that the internal pressures of the adsorber and the reservoir means are raised to elevated levels;

(b) shutting off the feed stream flow to the adsorber inlet and the product gas flow between the adsorber outlet and the reservoir means and venting the adsorber inlet so that the internal pressure of the adsorber falls below that of the reservoir means;

(c) conducting a flow of product gas from the reservoir means into the adsorber outlet while the feed stream flow to the adsorber inlet remains shut off;

(d) directing the feed stream into the adsorber inlet to resume feed stream flow thereto and so that the internal pressure of the adsorber equalizes with that of the reservoir means;

(e) shutting off the flow of product gas between the reservoir means and the adsorber so that the continued flow of the feed stream into the adsorber inlet raises the internal pressure of the adsorber to a high level; and (f) routing product gas from the adsorber outlet into the reservoir means so that product gas begins to re-accumulate in the reservoir means and so that the internal pressure levels of the adsorber and reservoir means move toward equalization.

10. The process as defined in claim 9 wherein the step of routing is carried out while the feed stream continues to be directed into the adsorber inlet.

11. The process as defined in claim 9 wherein the step of routing is followed by a repeat of steps (a) through (f).

12. The process as defined in claim 9 wherein the bed of adsorbent material is adapted to fractionate nitrogen from a feed stream of air so that the product gas exiting the adsorber outlet during steps (a) and (f) is an oxygen-rich gas.

13. A pressure swing adsorption system comprising an adsorber having an inlet and an outlet and a bed of adsorbent material adapted to fractionate at least one constituent from a gaseous mixture routed through the adsorber between the adsorber inlet and the adsorber outlet;

reservoir means for receiving product gas exiting the adsorber outlet;

means for directing a feed stream of a gaseous mixture into the adsorber inlet;

first valve means associated with the directing means for selectively conducting the flow of the gaseous mixture into the adsorber inlet or shutting off the flow of the gaseous mixture into the adsorber inlet and for venting the adsorber inlet when the flow of the gaseous mixture into the adsorber inlet is shut off;

second valve means interposed between the adsorber outlet and the reservoir means for selectively conducting or shutting off the flow of product gas between the adsorber outlet and the reservoir means;

control means associated with the first and second valve means so that the system cycles through the sequential stages of;

(a) directing the feed stream into the inlet o the adsorber so that product gas exits the adsorber outlet and accumulates in the reservoir means and so that the internal pressures of the adsorber and the reservoir means are raised to elevated levels;

(b) shutting off the feed stream flow to the adsorber inlet and the product gas flow between the adsorber outlet and reservoir means and venting the adsorber inlet so that the internal pressure of the adsorber falls below that of the reservoir means;

(c) conducting a flow of product gas from the reservoir means into the adsorber outlet while the feed stream flow to the adsorber inlet remains shut off; and (d) directing the feed stream into the adsorber inlet to resume feed stream flow thereto and so that the internal pressure of the adsorber equalizes with that of the reservoir means.

14. The system as defined in claim 13 wherein said control means includes timing mechanisms operatively connected to said first and second valve means for actuating said valve means at the end of preselected periods of time so that the aforesaid stages of the system cycles are performed during intervals of predetermined duration.

15. A pressure swing adsorption system comprising:

an adsorber having an inlet and an outlet and a bed of adsorbent material adapted to fractionate at least one constituent from a gaseous mixture routed through the adsorber between the adsorber inlet and the adsorber outlet;

reservoir means for receiving product gas exiting the adsorber outlet;

means for directing a feed stream of a gaseous mixture into the adsorber inlet;

first valve means associated with the directing means for selectively conducting the flow of the gaseous mixture into the adsorber inlet or shutting off the flow of the gaseous mixture into the adsorber inlet and for venting the adsorber inlet when the flow of the gaseous mixture into the adsorber inlet is shut off;

second valve means interposed between the adsorber outlet and the reservoir means for selectively conducting or shutting off the flow of product gas between the adsorber outlet and the reservoir means;

control means associated with the first and second valve means so that the system cycles through the sequential stages of;

(a) directing the feed stream into the inlet of the adsorber so that product gas exits the adsorber outlet and accumulates in the reservoir means and so that the internal pressures of the adsorber and the reservoir means are raised to elevated levels;

(b) shutting off the feed stream flow to the adsorber inlet and the product gas flow between the adsorber outlet and reservoir means and venting the adsorber inlet so that the internal pressure of the adsorber falls below that of the reservoir means;

(c) conducting a flow of product gas from the reservoir means into the adsorber outlet and directing the feed stream flow into the adsorber inlet to resume feed stream flow thereto so that the internal pressure levels of the adsorber and the reservoir means move toward equalization;

(d) shutting off the flow of product gas between the reservoir means and the adsorber so that the continued flow of the feed stream into the adsorber inlet raises the internal pressure of the adsorber to a high level; and (e) routing product gas from the adsorber outlet into the reservoir means so that the product gas begins to re-accumulate in the reservoir means and so that the internal pressure levels of the adsorber and reservoir means move toward equalization.

16. The system as defined in claim 15 wherein said control means includes timing mechanisms operatively connected to said first and second valve means for actuating said valve means at the end of preselected periods of time so that the aforesaid cycling stages are performed during intervals of predetermined duration.

17. A pressure swing adsorption system comprising:

an adsorber having an inlet and an outlet and a bed of adsorbent material adapted to fractionate at least one constituent from a gaseous mixture routed through the adsorber between the adsorber inlet and the adsorber outlet;

reservoir means for receiving product gas exiting the adsorber outlet;

means for directing a feed stream of a gaseous mixture into the adsorber inlet;

first valve means associated with the directing means for selectively conducting the flow of the gaseous mixture into the adsorber inlet or shutting off the flow of the gaseous mixture into the adsorber inlet and venting the adsorber inlet when the flow of the gaseous mixture into the adsorber inlet is shut off;

second valve means interposed between the adsorber outlet and the reservoir means for selectively conducting or shutting off the flow of product gas between the adsorber outlet and the reservoir means;

control means associated with the first and second valve means so that the apparatus cycles through the sequential stages of:

(a) directing the feed stream flow into the inlet of the adsorber so that product gas exits the adsorber outlet and accumulates in the reservoir means and so that the internal pressures of the adsorber and the reservoir means are raised to elevated levels;

(b) shutting off the feed stream flow to the adsorber inlet and the product gas flow between the adsorber outlet and the reservoir means and venting the adsorber inlet so that the internal pressure of the adsorber falls below that of the reservoir means;

(c) conducting a flow of product gas from the reservior means into the adsorber outlet while the feed stream flow to the adsorber inlet remains shut off;

(d) directing the feed stream into the adsorber inlet to resume feed stream flow thereto and so that the internal pressure of the adsorber equalizes with that of the reservoir means;

(e) shutting off the flow of product gas between the reservoir means and the adsorber so that the continued flow of the feed stream into the adsorber inlet raises the internal pressure of the adsorber to a high level; and (f) routing product gas from the adsorber outlet into the reservoir means so that product gas begins to re-accumulate in the reservoir means and so that the internal pressure levels of the adsorber and reservoir means move toward equalization.

18. The system as defined in claim 17 wherein said control means includes timing mechanisms operatively connected to said first and second valve means for actuating said valve means at the end of preselected periods of time so that the aforesaid cycling stages are performed during intervals of predetermined duration.

19. The system as defined in claim 17 wherein said directing means includes a compressor having an inlet and an outlet and said first valve means includes a four-way valve operatively connected between the compressor inlet, compressor outlet and the adsorber inlet so that during one setting of the valve, the feed stream is pumped by the compressor into the adsorber inlet and during another setting of the valve, the adsorber inlet is vented through the compressor inlet.

20. The system as defined in claim 17 wherein the bed of adsorbent material is adapted to fractionate nitrogen from a feed stream of air so that product gas collected by the reservoir means is an oxygen-rich gas.

* * * * *

UNITED STATES PATENT AND TRADEMARK OFFICE
CERTIFICATE OF CORRECTION

PATENT NO. : 4,892,566

DATED : January 9, 1990

INVENTOR(S) : Ravinder K. Bansal and Edward E. Vrana

It is certified that error appears in the above-identified patent and that said Letters Patent is hereby corrected as shown below:

Column 5, line 25, "stag" should be --stage--.

Column 9, line 44, "a" should be --at--.

Column 11, line 34, after "the" (first occurrence), insert --venting--.

Column 12, line 25, "ga" should be --gas--.

Column 13, line 23, "o" should be --of--.

Signed and Sealed this

Twenty-fifth Day of December, 1990

Attest:

HARRY F. MANBECK, JR.

*Attesting Officer*     *Commissioner of Patents and Trademarks*